US006990379B2

(12) United States Patent
Gonzales et al.

(10) Patent No.: US 6,990,379 B2
(45) Date of Patent: Jan. 24, 2006

(54) METHOD AND APPARATUS FOR PROVIDING A DYNAMIC RESOURCE ROLE MODEL FOR SUBSCRIBER-REQUESTER BASED PROTOCOLS IN A HOME AUTOMATION AND CONTROL SYSTEM

(75) Inventors: Greg Gonzales, Las Cruces, NM (US); Brian D. Baker, Tucson, AZ (US)

(73) Assignee: Microsoft Corporation, Redmond, WA (US)

( * ) Notice: Subject to any disclaimer, the term of this patent is extended or adjusted under 35 U.S.C. 154(b) by 337 days.

(21) Appl. No.: 10/153,419

(22) Filed: May 22, 2002

(65) Prior Publication Data

US 2003/0040819 A1 Feb. 27, 2003

Related U.S. Application Data

(63) Continuation-in-part of application No. 09/955,570, filed on Sep. 17, 2001, now abandoned, which is a continuation of application No. 09/751,383, filed on Dec. 29, 2000, now abandoned.

(60) Provisional application No. 60/173,741, filed on Dec. 30, 1999.

(51) Int. Cl.
*G06F 19/00* (2006.01)
*G06F 13/00* (2006.01)

(52) U.S. Cl. .......................... 700/19; 700/23; 700/276; 709/201; 709/223; 340/3.1

(58) Field of Classification Search .................. 700/19, 700/23, 27, 276, 277, 284; 709/223, 224, 709/201; 340/310.1, 3.1, 3.3, 3.32, 825.69, 340/825.72, 825.52; 375/259; 370/254, 908, 370/910

See application file for complete search history.

(56) References Cited

U.S. PATENT DOCUMENTS

| | | | | | |
|---|---|---|---|---|---|
| 5,526,358 | A | * | 6/1996 | Gregerson et al. | 709/221 |
| 5,621,662 | A | | 4/1997 | Humphries et al. | |
| 5,699,351 | A | * | 12/1997 | Gregerson et al. | 370/256 |
| 5,793,968 | A | * | 8/1998 | Gregerson et al. | 709/209 |
| 5,841,360 | A | | 11/1998 | Binder | |
| 5,877,957 | A | | 3/1999 | Bennett | |
| 5,959,536 | A | * | 9/1999 | Chambers et al. | 710/104 |
| 6,192,282 | B1 | * | 2/2001 | Smith et al. | 700/19 |

OTHER PUBLICATIONS

CEBus: "CAL Context Description", EIA–600.82, Electronics Industries Association, Feb., 2, 1996, pps. 1–15.*
"Introduction to the CEBus Standard", EIA–600.10, Electronics Industries Association, Feb. 5, 1995, pps. 1–17.*
CEBus: "PL Physical Layer & Medium Specification", EIA–600.31, Electronics Industries Association, Aug. 30, 1995, pps. 1–25.*
CEBus: "RF Physical Layer & Medium Specification", EIA–600.35, Electronics Industries Association, Aug. 30, 1995, pps. 1–17.*

(Continued)

*Primary Examiner*—Emanuel Todd Voeltz
(74) *Attorney, Agent, or Firm*—Christensen O'Connor Johnson Kindness PLLC

(57) ABSTRACT

A method of dynamically selecting a role for a resource device employed in a scene automation and control system is provided. The method comprises providing an object in a resource device having a plurality of predetermined roles that are dynamically settable, said roles including a requester role and a subscriber role. The method also comprises automatically setting the role of the resource device in response to either the receipt of a setting message or the manual adjustment of the resource device. Preferably, each object has a plurality of instances, each of which is settable. Further, preferably, the capability of an object (instance) to take on a role is preset. In addition to subscriber and requester roles, preferably, objects (instances) also include administrator and active roles.

34 Claims, 10 Drawing Sheets

OTHER PUBLICATIONS

CEBus: "Common Application Language (CAL) Specification", EIA–600.81, Electronics Industries Association, Sep. 17, 1996.*

CEBus Industry Council (CIC), *HomePnP ™ Specification Version 1.0, Home Plug & Play™:CAL–Based Interoperability for Home Systems,* Indianapolis, Ind., Apr. 9, 1998, pp. 1–111.

Evans, Grayson, "CEBus: Defining the Future of Residential Communications," *Australian Electronics Engineering 30*(3):34–36, 38, Mar. 1997.

Lawrenz, Wolfhard, "eBus—Der Bus für die Heizungstechnik," *Elektronik 47*(2):60, 62, 64–66, Jan. 20, 1998.

Markwater, Brian, and Larry Stickler, "Design Techniques for Plug–and–Play in 'Smart Homes' and Consumer Products," *Electronic Design 45*(17):64–66, 68, Aug. 18, 1997.

Tsang, Peter W. M., and Raymond W. C. Wang, "Development of a Distributive Lighting Control System Using Local Operating Network," *IEEE Transactions on Consumer Electronics 40*(4):879–889, Nov. 1, 1994.

Wright, Maury, "Home–Automation Networks Mature While the PC Industry Chases a New Home LAN," *EDN,* Jun. 4, 1998, pp. 101–102, 104, 106, 108, 110, 112–114.

* cited by examiner

| Variable Name | Variable Function |
|---|---|
| role_capacity | Capable of Supporting Roles (Bit Field)<br>Bit 0: Administrator<br>Bit 1: Subscriber<br>Bit 2: Requester<br>Bit 3: Active |
| current_role | Current Roles Selected (Bit Field)<br>Bit 0: Administrator<br>Bit 1: Subscriber<br>Bit 2: Requester<br>Bit 3: Active |
| role_protection | Roles Protected (Bit Field)<br>Bit 0: Administrator<br>Bit 1: Subscriber<br>Bit 2: Requester<br>Bit 3: Active |

Fig.5

TYPICAL RESOURCES BOUND WITH UNIQUE RESOURCE IDENTIFIER

DYNAMIC RESOURCE ROLE MODEL RESOURCES BOUND WITH UNIQUE RESOURCE IDENTIFIER

METHOD AND APPARATUS FOR PROVIDING A DYNAMIC RESOURCE ROLE MODEL FOR SUBSCRIBER-REQUESTER BASED PROTOCOLS IN A HOME AUTOMATION AND CONTROL SYSTEM

CROSS-REFERENCES TO RELATED APPLICATIONS

This application is a continuation-in-part of U.S. patent application Ser. No. 09/955,570, filed Sep. 17, 2001 abandoned, which is a continuation of U.S. patent application Ser. No. 09/751,383, filed Dec. 29, 2000, now abandoned, which claims the benefit of prior U.S. Provisional Patent Application No. 60/173,741, filed Dec. 30, 1999, each of which applications is expressly incorporated herein by reference.

FIELD OF THE INVENTION

The present invention relates to the field of home automation and control systems and, more particularly, to a method and apparatus for providing dynamic roles in subscriber-requester based protocols used in home automation and control systems.

BACKGROUND OF THE INVENTION

Home automation and control systems are used to control the behavior of an environment such as a home or office building. Home automation and control systems create and launch "scenes," involving multiple controlled devices. A scene is a collection of devices, such as lighting, heating and air conditioning, landscape sprinklers, window treatments, audio/visual equipment, water heaters, humidifiers, etc., set in a specific state. For example, one scene could be created where certain lights are set at specified levels, where the thermostat is set at a specified level, and where a stereo unit is activated and set to a particular station. This setting of devices constitutes one scene, and may be triggered by a trigger event also defined by the user, such as the press of a button on a remote control. A different scene may set additional devices and some or all of the members of the one scene to the same or different states. Current home automation and control systems use automation and control protocols to create these scenes, and some of these automation and control protocols are subscriber-requester based.

In a subscriber-requester based protocol, also called a subscriber-publisher based protocol, the system consists of device resources made up of "objects" that interoperate with each other depending on their roles. The subscriber role, also called the member role, provides a way for a device resource to be affected by other device resources. The requester role, also called the publisher role, provides a way for a device to affect other devices. In normal operation, requester objects from one device resource send commands to associated subscriber objects in other devices. Currently the role an object can perform is predetermined and cannot be dynamically changed. When multiple requester objects influence the same subscriber object(s), the requester objects may need to know what demands the other requester objects that share the same binding are making. Currently automation and control subscriber-requester based protocols solve this problem using several methods, each of which has significant drawbacks.

One method is to have the requester object get information about what other requester objects are demanding from the subscriber object in the same device. This method is only effective if the device has both roles which may not be so. Another method is to create listener role objects that act like subscribers in that they can receive instructions from requester objects but unlike subscriber objects a listener role object does not respond to the requester demand, or to create redundant and inactive subscriber role objects. Creating these additional objects takes up additional memory and processing resources, which is undesirable in applications employing small and relatively inexpensive devices.

Therefore, in light of the above, there is a need for a subscriber-requester based automation and control system protocol that allows dynamic object role selection while minimizing the number of needed resource objects.

SUMMARY OF THE INVENTION

The present invention provides a method for dynamic object role selection in a resource device of a subscriber-requester based automation and control system. In accordance with the invention, the role of an object is dynamically settable. Preferably, multiple instances of the object are available, each instance being dynamically settable depending upon the role to be "played" by the instance in a scene. Preferably, multiple roles can be "played" by an instance. A resource object with the requester role set will send a message to other resource object(s) that share the same binding. How the receiving objects act in response to the received message depends on the role of the receiving object. If the receiving object has the subscriber role set, the receiving object will cause the device to be affected by the received message in the normal subscriber manner. If the receiving object has the requester role set, the receiving object's knowledge of other requester demands on the resource object's associated subscriber objects will be updated.

According to an embodiment of the present invention, a microcontroller is embedded into each device within a home automation and control system formed in accordance with the invention along with logic to implement the subscriber-requester based automation and control system protocol with dynamic resource object role selection.

An aspect of the invention also provides for multiple roles for the same resource object. A resource object with both requester and subscriber roles can both affect and be affected by one or more resources. The ability of a resource object to be both a requester and a subscriber can simplify the implementation of system-wide resource objects compared to device-wide resource objects, to create "house scenes."

An aspect of the invention also provides for adding roles to the same resource objects. Examples of roles that may be added are active and passive roles and an administrator role. These additional roles may be used to designate objects as responsible for performing cleanup activities, to assign responsibility as the designated responder object for an associated resource instance in order to reduce network traffic, or to differentiate objects that only passively display from objects that actively "do something."

Another aspect of the invention provides for a resource object to advertise which roles the resource object is capable of supporting, and which roles the resource object is currently selected to support.

Generally described, the present invention provides a method for dynamic object role selection in subscriber-requester based automation and control system protocols. According to one embodiment of the present invention, each resource object includes multiple instances of the object, each of which contains a predetermined list of roles the instance is capable of supporting. Each resource instance contains a dynamic list of roles that have been currently selected for the instance. Each device participating in a home automation system is equipped with control logic for dynamically selecting the instance roles of the device resource.

When any device in the system receives a request to modify the role(s) of a device resource object or instance of an object if the device resource contains multiple instances of an object, the device checks to see if the resource object (or instance) is capable of supporting the requested role change(s). If the resource object (or instance) is capable of supporting the requested role change(s), the requested role changes are made.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a diagram showing an illustrative software variable data structure utilized in an actual embodiment of the present invention.

DETAILED DESCRIPTION OF THE PREFERRED EMBODIMENT

The present invention is directed to a method and apparatus for dynamic object role selection in subscriber-requester based automation and control system protocols. According to an embodiment of the present invention, a device is provided for use in a home automation system that includes control logic that implements a subscriber-requester based home automation and control system protocol including the dynamic resource role method of the invention. The dynamic resource role method allows a resource object (including instances of the object) to perform multiple roles. An administrator role may be added to the roles a resource object can support. If an administrator role is enabled, each network resource binding or association is assigned one and only one device resource object as administrator for the binding or association. The administrator role performs cleanup of invalid resource instantiations and responds as the designated resource instantiation responder to reduce network traffic. When multiple such devices are utilized throughout a home automation system, requester objects that influence the same bound or associated subscriber object(s) will know what demands other system requester objects are making on the associated subscribers, and respond accordingly. Invalid resource bindings or associations are automatically cleaned up during manual scene programming, so that resources are not tied to scenes that are no longer valid because the scenes can no longer be triggered.

Those skilled in the art will appreciate that the dynamic resource role method of the invention is subscriber-requester based protocol independent and may be implemented using many types of subscriber-requester based protocols, such as the Simple Control Protocol, the Universal Plug and Play protocol, and other protocols known to those skilled in the art.

Figure 1:
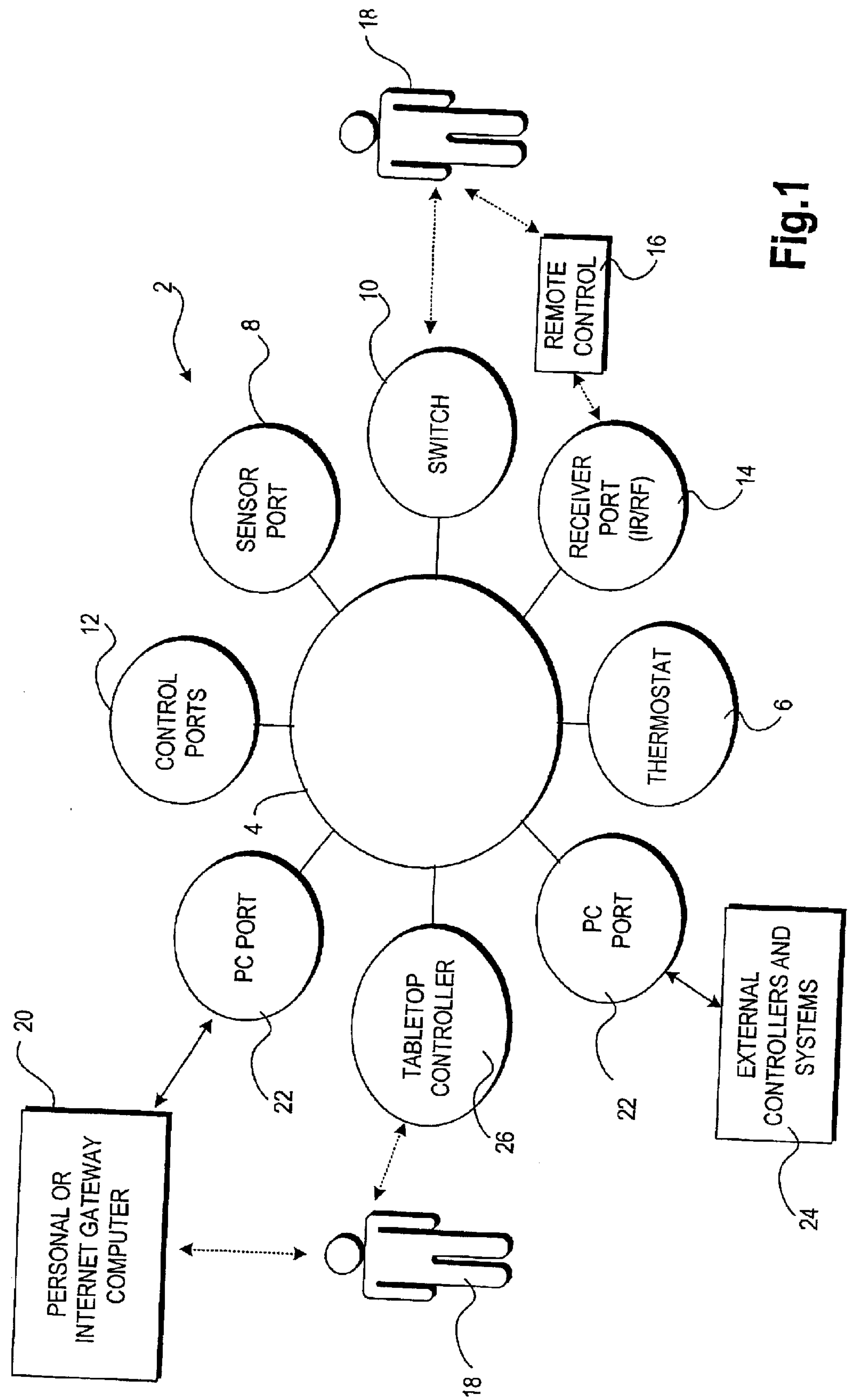
FIG. 1 is a block diagram showing an illustrative home automation system that provides an operating environment for an actual embodiment of the present invention.

Referring now to the figures, in which like numerals represent like elements, an actual embodiment of the present invention will be described. FIG. 1 provides an overview of an illustrative home automation system 2 in which aspects of the present invention may be practiced. It should be appreciated that the use of the term "home automation" includes, but is not limited to, home automation, home networking, or connected home systems, which describe a home where products are not only connected or integrated with each other locally, but might also be connected or integrated across the Internet and via other networks. Moreover, although the home automation system 2 is described herein as being implemented in a home environment, those skilled in the art should appreciate that such systems may be similarly deployed in a business, boat, factory, or other premises where environmental automation is desired.

The home automation system 2 typically comprises a number of participating devices connected by a common bus 4, or through some other communication means. In the actual embodiment of the present invention described herein, the bus 4 comprises typical household wiring. Those skilled in the art should appreciate, however, that other types of communications media may be utilized including twisted wire pair, coaxial cable, fiber optic cable, or other similar media. Additionally, wireless communications media, such as infrared ("IR") or radio frequency ("RF"), may also be utilized to provide inter-device communication.

The devices connected to the bus 4 and participating in the home automation system 2 may comprise a wide variety of devices for performing a wide variety of functions. For instance, such devices may include a thermostat device 6 for controlling temperature, a sensor port device 8 for detecting motion, light, sound, or other activity, a switch device 10 for triggering scenes or controlling an attached load, and a control port device 12 for controlling an attached load, such as a lamp, appliance or motor. Additionally, such devices may include a receiver port device 14 for triggering scenes based on IR or RF signals received from a wireless remote control 16 operated by a user 18. External controllers and systems 24 may also participate in the home automation system 2 through the use of a PC Port device 22 produced by C-SMART LLC of Las Cruces, N. Mex. The PC Port device 22 provides an interface between devices compatible with the home automation system 2, and devices from other manufacturers that are not natively compatible with the home automation system 2.

The user 18 may interact with the home automation system 2 through the devices. For instance, the user 18 may utilize the switch device 10 to control a load connected to a control port device 12 or to trigger a scene. The user 18 may also interact with the home automation system 2 through the use of a personal or Internet gateway computer 20. The personal or Internet gateway computer 20 is connected to the bus 4 and may participate in the home automation system 2 through the use of a PC Port device 22. The PC Port device 22 provides bidirectional communication support for the personal computer 20. In this manner, a user 18 can interact with the home automation system 2 through the computer 20, which is equipped with appropriate software, to interrogate devices, create or launch scenes, and perform other functions. The user 18 may also interact with the home automation and control system 2 through the use of a tabletop controller 26 to launch scenes.

Those skilled in the art will appreciate that the dynamic system resource role model described herein can be applied to a variety of user and programming interfaces in subscriber-requester based protocols to improve resource efficiency, such as the Simple Control Protocol, the Universal Plug and Play protocol which is run on a Local Area Network (LAN), and other protocols known to those skilled in the art. One actual embodiment of the present invention applies the dynamic system resource role model to a base communication protocol known as the CEBus and Home Plug & Play protocol available from the CEBus Industry Council, Inc.

Figure 2:
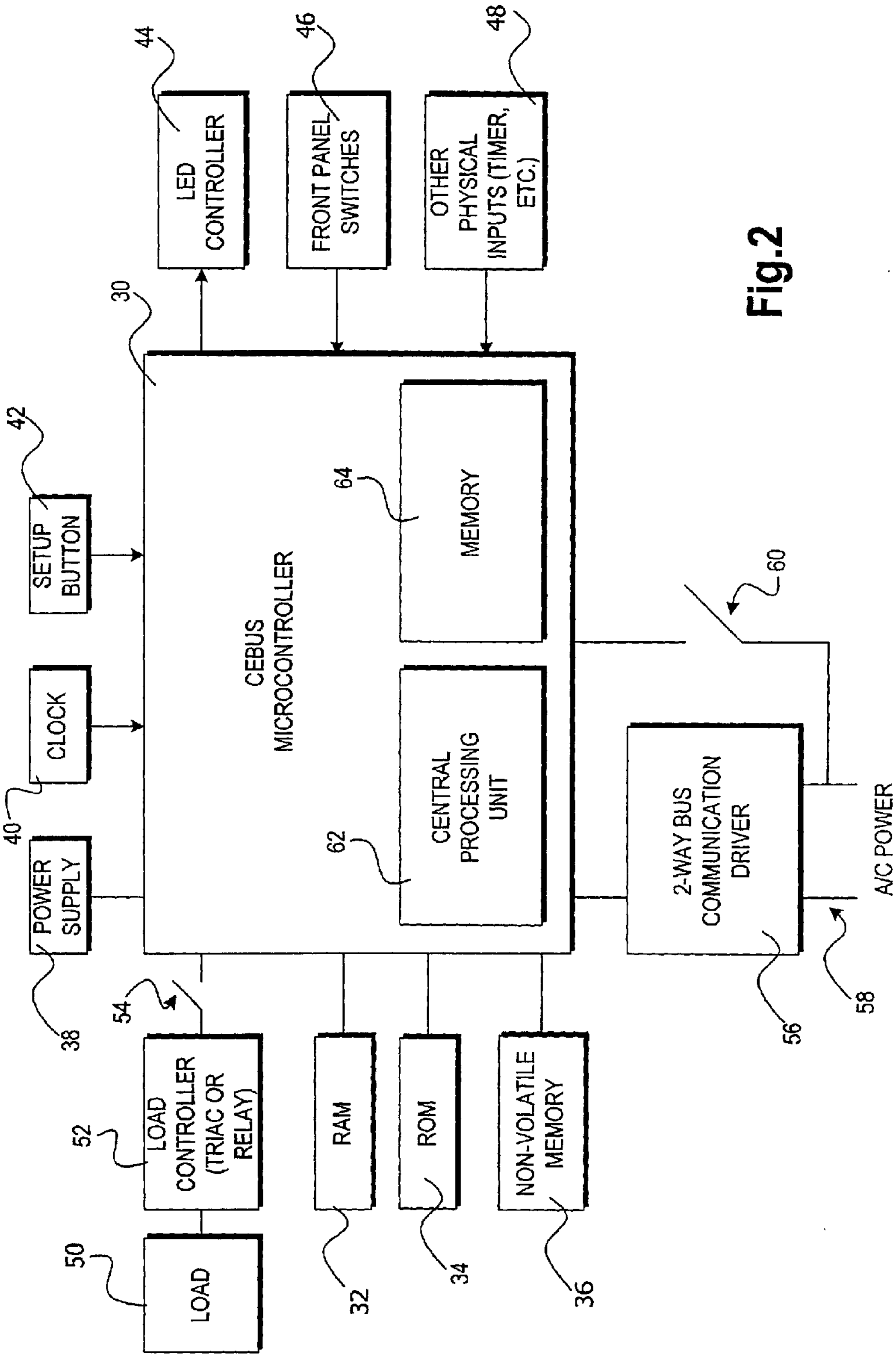
FIG. 2 is a block diagram showing a microcontroller and related circuitry that provides distributed control functionality and a simple programming interface in an actual embodiment of the present invention.

Turning now to FIG. 2, an illustrative microcontroller and related control logic will be described that incorporates the dynamic resource role model to improve control functionality in the actual embodiment of the present invention described herein. As mentioned briefly above, according to the actual embodiment of the present invention described herein, the microcontroller and associated circuitry shown in FIG. 2 is incorporated into each device in a home automation system.

At the heart of the microcontroller and control logic shown in FIG. 2 is a CEBus® microcontroller 30. The CEBus® microcontroller 30 comprises a central processing unit 62 and internal memory 64 for executing user programs, paired with functionality for interfacing with a power-line networking protocol, such as the CEBus® protocol from the CEBus® Industry Council, Inc. As known to those skilled in the art, the CEBus(g standard (EIA-600) is an open standard for home automation that defines a common language for device communication over various media, including power lines. Those skilled in the art should appreciate that while the CEBus® protocol is utilized for device communication in the actual embodiment of the present invention described herein, other types of protocols may also be utilized.

In the actual embodiment of the present invention described herein, the CEBus® microcontroller 30 comprises a CEWay PL-One from the Domosys Corporation of Sainte-Foy, Quebec, Canada. The CEWay PL-One is a power line transceiver integrated circuit that integrates the CEBus® physical layer and embeds an 8052 microcontroller core. The CEWay PL-One includes 256 bytes of internal data memory, three 16-bit timers/counters, a full duplex serial port, and the ability to access up to 64 kb of external data memory and up to 64 kb of external code memory.

In the embodiment of the invention described herein, the CEWay PL-One is paired with an external random access memory ("RAM") 32, an external read-only memory ("ROM") 34, and a writeable non-volatile memory 36, such as flash memory. As will be described in greater detail below, the non-volatile memory 36 may be used to store and retain scene settings for the device when power is removed. These memory devices may also store computer-readable instructions, data structures, program modules or other data necessary for providing the functionality described herein.

The CEBus® microcontroller 30 is also paired to a load 50 through a load controller 52. The load 50 comprises an electrical load, such as that provided by a lamp, electrical equipment or home appliance. The load controller 52 may be capable of sensing the level of the load 50 and is capable of setting the load 50 to a particular level. The load controller 52 communicates to the CEBus® microcontroller 30 so that sensing the level of the load 50 or setting the load 50 to a particular level may be accomplished under programmatic control. According to the actual embodiment of the present invention described herein, the load controller 52 may comprise a triac, for gradually varying the level of a load, or a relay for switching a load on or off. Other types of load control devices such as latching relays, bi-state relays, or other devices known to those skilled in the art may be utilized. The load 50 and load controller 52 may also be electrically isolated from the CEBus® microcontroller 30 through the use of a switch 54, such as an air-gap switch.

The CEBus® microcontroller 30 may also interface with an alternating current ("A/C") power line 58 through the use of a 2-way bus communication driver 56. The two-way bus communication driver 56 receives data transmitted on the A/C power line 58 and converts this data to a signal compatible with the CEBus® microcontroller 30. The CEBus microcontroller 30 may be electrically isolated from the A/C power line 58 through the use of a switch 60, such as an air-gap switch. As known to those skilled in the art, the CEBus® microcontroller 30 may also receive electrical power from a power supply 38 and a clock signal from a clock 40.

The CEBus® microcontroller 30 also interfaces with several input and output devices. In particular, the CEBus® microcontroller 30 interfaces with a light emitting diode ("LED") controller 44. The LED controller 44 provides functionality for driving one or more LEDs mounted on the device. As will be described in greater detail below, the LEDs may be used to provide an indication to the user as to whether the device is in a normal operation mode, a programming mode, or in another state.

The CEBus® microcontroller 30 also receives input from a number of front panel switches 46. The front panel switches 46 may be mounted on a panel of the device accessible to the user. These switches may be utilized to control a local load 50, or to trigger a scene that includes other devices. Additionally, a dedicated setup button 42 may be provided for placing the device into a programming mode. According to the actual embodiment of the present invention described herein, the setup button 42 is located behind a face plate of the device to prevent inadvertent selection of the programming mode. Other physical inputs 48 may also be provided to the CEBus® microcontroller 30, such as a timer. The front panel switches 46 and the setup button 42 are described in greater detail below with respect to FIGS. 3A–3C.

Figure 3C:
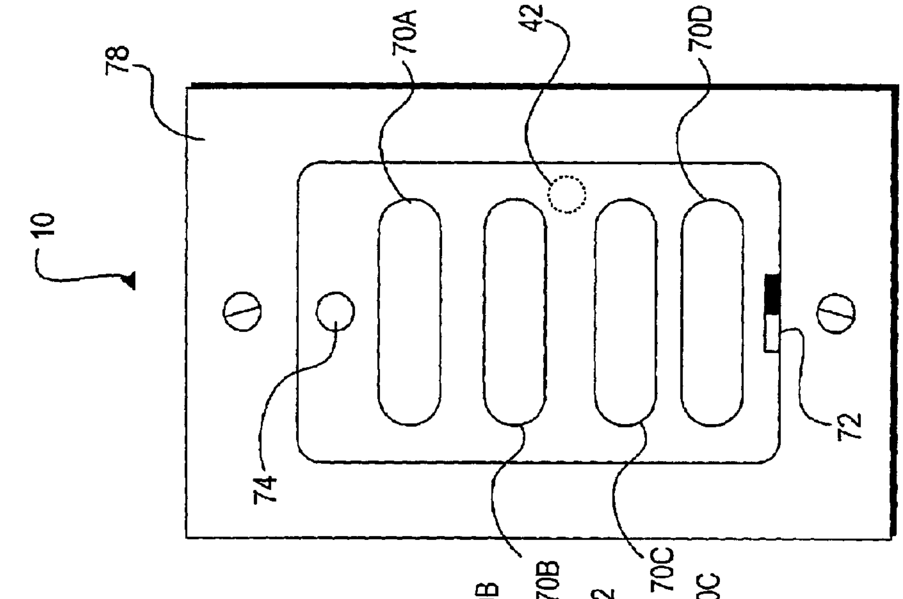
FIGS. 3A–3C are block diagrams showing illustrative switch devices utilized in an actual embodiment of the present invention.
Figure 3B:
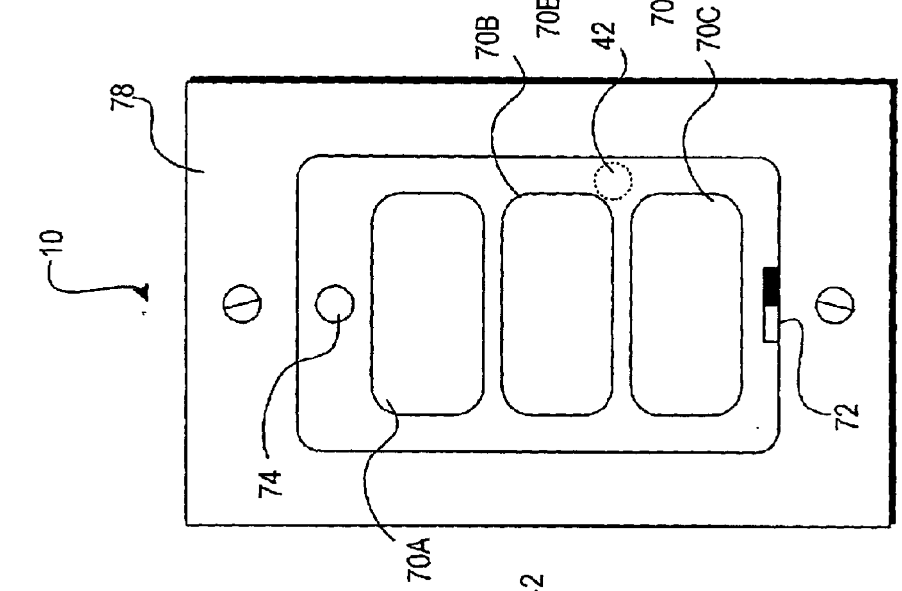
Figure 3A:
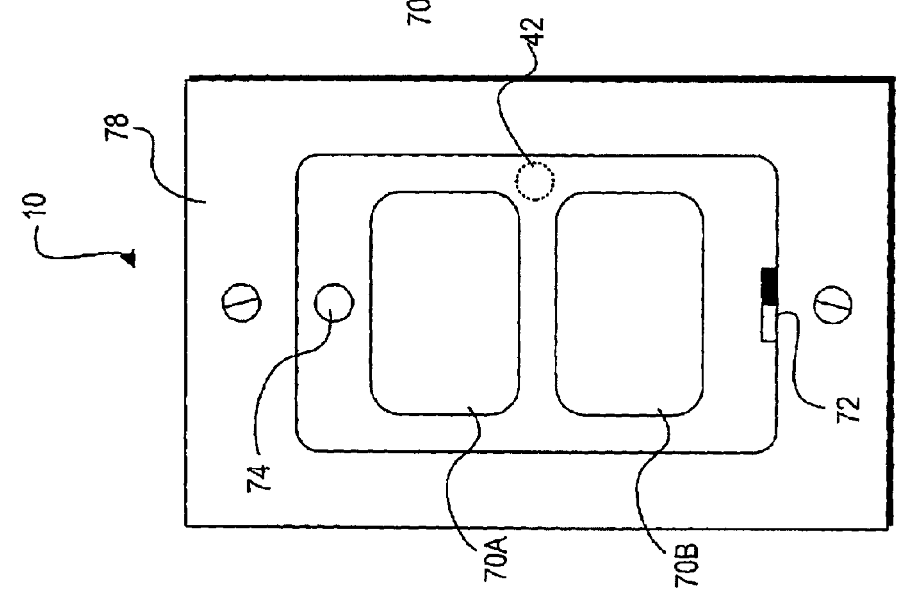

Referring now to FIG. 3A, an illustrative switch device 10 will be described. In the actual embodiment of the present invention described herein, the switch device 10 provides a primary interface for a user to the home automation system. In particular, the switch device 10 may be utilized by the user to control a local load, to program a scene, and to trigger a scene. In this regard, the switch device 10, including the CEBus® microcontroller and related circuitry, is mountable within a standard wall-mount switch plate receptacle. Those skilled in the art should appreciate that while the switch device 10 is described herein as the primary interface to the home automation system, the functionality and interface provided by the switch device 10 for controlling loads, programming scenes, and launching scenes may be similarly provided by other types of devices.

As described above, the switch device 10 includes the CEBus® microcontroller and related circuitry for interfacing with the home automation system and for providing the simple user interface. The switch device 10 also includes one or more buttons 70A–70B. In the actual embodiment of the present invention described herein, one of the buttons is dedicated for local load control, such as 70A. The local load control button may utilize a dimmer to gradually change the value of the local load to which the switch is connected, such as a light. Alternatively, the local load control button may be utilized in connection with a relay for turning the local load on or off.

If the local load control button utilizes a dimmer, the button may be held down to gradually ramp the local load from an off state to a maximum value state. When the local load reaches its maximum value state, the dimmer may then gradually return the load to its off state. As will be described in greater detail below, scenes may be assigned to the remaining buttons on the switch device 10. These buttons may then be utilized to trigger the assigned scene. Those skilled in the art should appreciate that the switch device 10 may be provided in a three-button 70A, 70B, 70C or four-button 70A, 70B, 70C, 70D configuration as shown in FIGS. 3B and 3C, respectively. Other configurations of the buttons on the switch device 10 will be apparent to those skilled in the art.

The switch device 10 also includes a visible LED 74. In the actual embodiment of the invention herein described, the LED 74 comprises a tri-state LED capable of displaying the colors red, amber, and green. The LED 74 provides a visual indication to a user regarding the current state of the switch device 10. For instance, one color of the LED 74 may indicate to the user that the switch device 10 is in a programming state and another color may indicate that the switch device 10 is in a normal operating state. The LED 74 may also be flashed in patterns in combination with the colors to provide other types of notifications. The LED 74 is controlled by the LED controller 44 described above with reference to FIG. 2.

The switch device 10 also comprises a setup button 42. As will be described in greater detail below, the setup button 42 is utilized to place the switch device 10 into one or more programming modes. In order to avoid inadvertent selection of the setup button 42, preferably the setup button is positioned so as to avoid accidental presses. In the actual switch embodiment, the setup button is mounted behind a switch device cover 78. In order to access the setup button 42, therefore, a user must remove the retaining screws and the switch device cover 78. If the local load control button utilizes a dimmer, the switch device 10 also includes an air-gap switch 72 for electrically isolating the local load from the power source.

Figure 4:
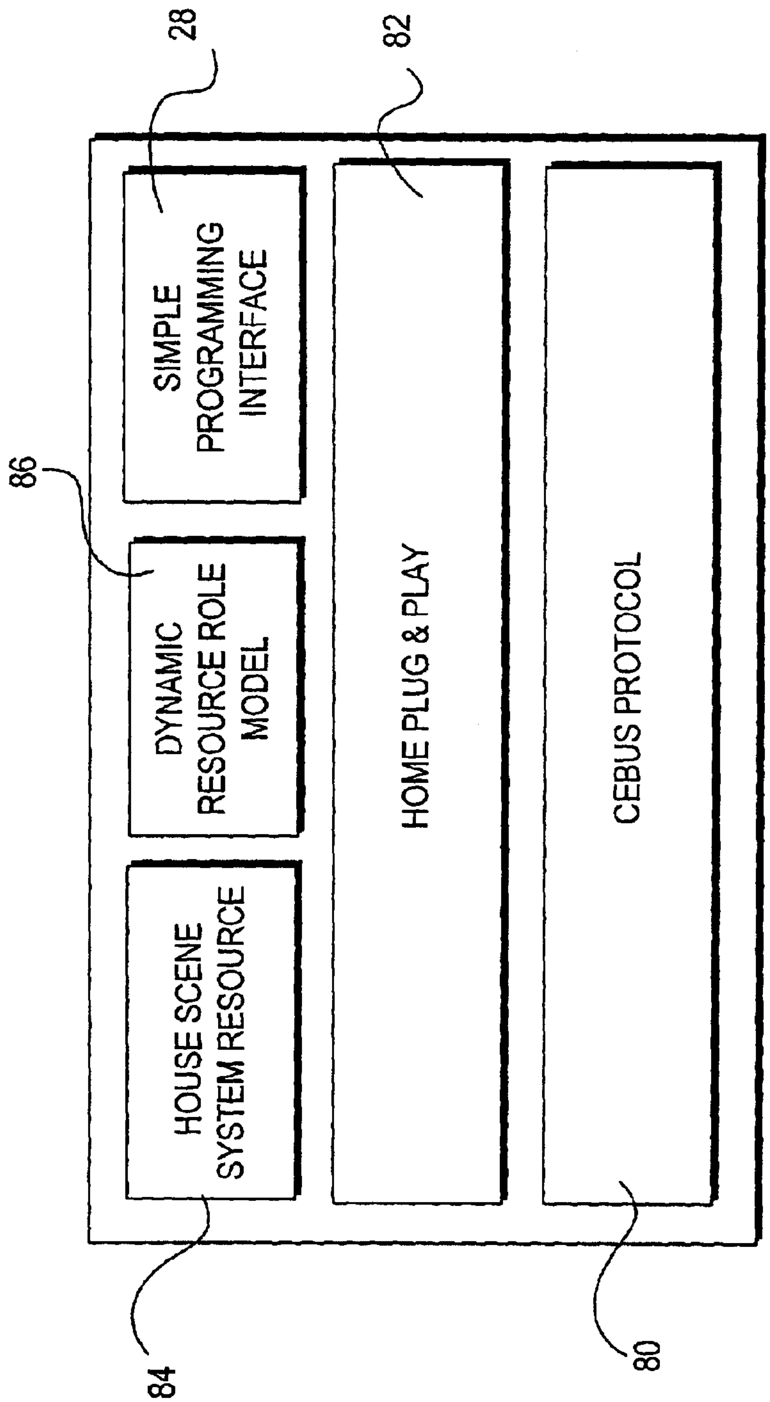
FIG. 4 is a block diagram showing the software architecture utilized in an actual embodiment of the present invention.

FIG. 4 illustrates a software architecture for implementing aspects of the present invention. As described briefly above, each device utilized in a home automation system according to the present invention includes a microcontroller and related circuitry for distributing control of the home automation system to each device and for providing a simple programming (SPI) interface. To provide such functionality, each device implements the CEBus® protocol 80 for low-level communication.

As known to those skilled in the art, the CEBus® protocol uses 120 v, 60-cycle, electrical wiring to transport messages between devices. Particularly, the CEBus® protocol 80 uses spread spectrum technology to overcome communication impediments found within electrical powerlines. Spread spectrum signaling works by spreading a transmitted signal over a range of frequencies, rather than using a single frequency. The CEBus® protocol 80 spreads its signal over a range from 100 Hz to 400 Hz during each bit in a data packet. However, instead of using frequency hopping or direct sequence spreading, the CEBus® protocol 80 sweeps through a range of frequencies as it is transmitted. As mentioned above, the CEWay PL-One from the Domosys Corporation implements the physical layer of the CEBus® protocol 80. Other layers of the CEBus® protocol 80 may be implemented in software.

One layer above the CEBus protocol 80 sits the Home Plug & Play protocol 82, also from the CEBus Industry Council, Inc. The Home Plug and Play protocol 82 implements the Home Plug and Play Specification that provides a uniform implementation for using the Common Application Language ("CAL") (EIA-721), from the Electronic Industries Alliance ("EIA"), as a language for inter-device communication. CAL is a high-level command language used by devices for communication over CEBus®. The Home Plug and Play protocol 82 provides uniform implementation rules for CAL, accommodates various communication protocols so that it works with multiple home network transports, defines common household objects through an object-oriented language, formalizes status, listener, and request objects, uses loose coupling to share status reports, and provides other functionality as known to those skilled in the art.

A house scene system resource 84, a dynamic resource role model 86 and a simple programming interface ("SPI") 88 all sit above the Home Plug and Play protocol 82. While the house scene system resource 84, the dynamic resource role model 86 and the SPI 88 can be implemented independently of each other, they are preferably used together. When used together, the house scene system resource 84, the dynamic resource model 86, and the simple programming interface 88 maximize the benefits provided separately by each of these elements. Therefore all three are used in the preferred and actual embodiment of the present invention described herein. The house scene system resource 84 when combined with the SPI 88 creates both distributed programming and distributed control with no single point of failure. The dynamic resource role model 86 enables a more efficient and compact implementation of the house scene resource 84 and the SPI 88.

The house scene system resource 84 provides a way of creating scenes where each system device maintains house scene definitions describing the state settings of the device for each house scene in which the device participates as a house scene member. Each house scene is assigned a unique house scene identifier. This allows one simple, short message containing the scene identifier to launch a scene regardless of the number of scene members. House scenes are created by having each individual device, when given an indication to learn a new house scene, locally save its membership status and its current device state. The membership status and the current state are associated with the house scene identifier for recall when a scene is launched. If a device is given an indication that the device is not a member of a particular house scene, the device is not required to save the house scene information. The scene trigger buttons 70B, 70C, 70D shown in FIGS. 3 A–3C are programmed by having the designated scene trigger button, when given an indication to learn a new house scene, locally save and associate the house scene identifier with that particular scene trigger button. Thereafter, when a scene trigger button that has learned or been associated with a house scene identifier is activated, it launches the house scene by broadcasting a launch command to the entire system that contains the associated house scene identifier. When a device in the system receives a broadcast scene launch command and the device membership status associated with the received house scene identifier indicates the device is a member of that house scene, the device retrieves from storage the locally saved scene state associated with that house scene identifier. This allows one simple, short message containing the scene identifier to launch a scene in normal operation with any number of scene members. Preferably, a house scene can also be launched by another entity, such as software running on a personal computer or an external controller, that is able to broadcast a scene launch command containing the a house scene identifier for that particular house scene. Each house scene stored by a device includes an internal house scene resource instance or copy in the device that is bound to or associated with the unique house scene identifier. To enable the device to be a participant of many different house scenes, where the device state in each house scene may be very different, the device requires an internal house scene resource instance or copy for each desired house scene. The system house scene resource method enables a device to be a member of multiple house scenes by providing a method to configure and bind (and unconfigure and unbind) a specific internal device instances to a specific scene identifier. Further details about the System House Scene Resource 84 are described in U.S. patent application Ser. No. 10/154,425, titled "Method and Apparatus for Providing Distributed Control of a Home Automation and Control System," the subject matter of which is incorporated herein by reference. The simple programming interface ("SPI") 88 provides a simple and consistent user interface for programming scenes and multi-ways within a home automation and control system. The SPI allows unlimited scene member manual adjustments before finalizing a scene, and automatically keeps track of all scene members, thereby reducing scene programming time and error rate. The SPI creates uniquely identified scenes by putting all devices in the home automation and control system in a system-wide scene programming mode when starting a programming session. Each and every scene member device is adjusted as many times as desired in any order. When all member devices have been adjusted to the final desired states, a trigger for the scene is selected, completing that programming session. At the end of a programming session, each device knows that if its load button has been used to adjust an associated load since the start of the last programming session and not subsequently removed as a scene member. If this condition is met, the device knows that it is part of the scene being programmed and that the device load control state value in the scene is the current device state load control value. Devices also know that if they have not been adjusted since the start of the last system programming session or have not been adjusted since they were last removed from the scene, they are not part of the scene being programmed in this programming session. The selection of the scene trigger initiates the capture of the created scene, ends the current programming session, and starts a new programming session. Further details of the SPI can be found in U.S. patent application Ser. No. 10/154,403, titled "Method and Apparatus for Providing Distributed Scene Programming in a Home Automation and Control System," the subject matter of which is incorporated herein by reference.

User interaction for programming and controlling the home automation system 2 will not be further described except where the dynamic resource role method makes the SPI 88 implementation more resource effective. Those skilled in the art will appreciate that the herein-described dynamic resource role method can be applied to other user and programming interfaces in subscriber-requester based protocols to improve resource efficiency.

The dynamic resource role model 86 is described in greater detail below with respect to FIGS. 5–10. The dynamic resource role model 86 enables resource roles to be changed dynamically in a consistent manner. The dynamic resource role model 86 draws on both the standard Home Plug and Play protocol 82 and CEBus protocol 80 to perform the needed functionality. The dynamic resource role model 86 enables efficient implementation of the house scene system resource 84 and improves SPI 88 functionality.

The dynamic resource role model 86 provides a resource management method for subscriber-requester based automation and control system protocols. In a subscriber-requester based protocol, also called subscriber-publisher protocol, the system consists of device resources made up of "objects" that interoperate with each other depending on their role. The subscriber or member role provides a way for a device resource object to be affected by other devices. The requester role provides a way for a device to affect other devices. In normal operation, requester objects from one resource send commands to associated subscriber resource objects. The dynamic resource role model 86 provides a method for dynamic resource object role selection, enables new roles, gives resources the ability to assign allowed roles, and provides for role protection. Preferably, the dynamic resource role model 86 allows the same resource object to have multiple roles. A resource object with both requester and subscriber roles can both affect and be affected by one or more resources. The ability for a resource object to be both a requester and a subscriber can simplify the implementation of system-wide resources such as house scenes that, unlike device specific resource objects, need system-wide resource status feedback. The dynamic resource role model 86 provides efficient system-wide resource status updating in an actual embodiment of the present invention.

The dynamic resource role model 86 employs a variable data structure that allows resource management variables to be added to one or more of the device resources. The resource management variable data structure utilized in an actual embodiment of the invention is shown in FIG. 5. The roles a resource instantiation is capable of supporting corresponds to bits set in a role capability variable. Each potential role is assigned a particular bit in the role capability variable. If the bit for a role is set in the role capability variable, the related role can be supported by the resource. If the bit is not set, the related role cannot be supported by the resource. Four roles are available in the variable data structure shown in FIG. 5—administrator role, subscriber role, requester role, and active role.

The roles a resource instantiation is currently selected to support correspond to the bits settings in a current role variable. Each role is assigned a particular bit in the current role variable. If the bit for a role is set in the current role variable, the related role is currently selected for the resource. If the bit is not set, the related role is not currently selected for the resource. As with the role-capacity variable, the roles are administrator, subscriber, requester, and active.

The ability to reassign the roles in a resource instantiation is dependent on the bits set in a role protection variable. Each role is assigned a particular bit in the role protection variable. If the bit for a role is set in the role protection variable, the related role selection is locked and cannot be modified until the bit is reset. The role protection variable offers a way to make sure that resources are not accidentally reprogrammed, since they must be unlocked before they can be changed. Again, the roles are administrator, subscriber, requester, and active.

As noted above, two roles in addition to the standard subscriber and requester roles are included in the resource management variable data structure. The added roles are the active role and the administrator role. The active role provides a way to distinguish passive display only subscribers from active subscribers that "do something."

The administrator role is associated with resource administration. In the actual embodiment of the home automation and control system described in this patent application and the related applications referenced above, all device resources that are associated by tight bindings (a device group) are assigned a unique resource instantiation identifier, called a channel number. For each unique resource channel number, one and only one of the device resource instantiations bound to that channel number will be selected to support the administration role. The resource instantiation selected to perform the administrator role performs cleanup of invalid resource instantiations and responds as the designated resource instantiation responder so as to reduce network traffic. The resource instantiation channel number is usually designated when the resource device that handles the administrator role is selected. To implement the SPI efficiently using dynamic resource roles, the administrator role is usually placed with the requester role in the resource instantiation associated with the trigger button that first captures a house scene. The administrator role can be transferred if required when a device with an administrative role is placed in an unconfigured mode or when a previously programmed trigger is overwritten. The administrative role cannot be handed off to a resource device that is not capable of supporting an administrative role.

As will be readily appreciated from the foregoing description and the following discussion, each resource device includes multiple instances of a resource object. The resource object can take on any combination of subscriber/requester/administrator/active roles. In contrast to prior requester-subscriber systems, the invention allows an instance of a resource device object to take on multiple roles.

Each role requires that the firmware included in a resource device support the roles associated with an instance. In this regard, each role has certain memory requirements and physical input limitations. For example, if a resource device has four input house scene triggers, the "requester" role need only be supported for four house scene resource instances because four is the maximum number of available configurable requester roles. While only four requester instances may be available, a larger number, such as thirty-two, subscriber instances may be available. These instances allow the resource device to be a subscriber in up to thirty-two house scenes, even though the device resource can be a requester in only four house scenes. Setting the role capacity requester bit and the subscriber bit in the four instances capable of being requester-subscriber and only the subscriber bit in the thirty-two instances capable of being subscriber only saves memory resources. The role capacity bits are set for all instances in a device when the application firmware is written, and cannot be changed. If no memory is reserved to support the requester role for a particular instance, that particular instance can never support the requester role, even though there may be other instances in the same device that can support the requester role.

Just because a role can be supported does not mean that a resource device has been programmed to perform that role. For example, a four-button dimmer has four house scene instances capable of supporting all four available roles (subscriber/active/requester/administrator) and thirty-two house scene instances (using the foregoing example) capable of supporting only two roles (subscriber/active). When a resource device is in the out-of-box state, none of these roles are actively assigned to any of the instances. The roles are assigned to an instance as part of the configuration process. In HPnP, when a particular instance is configured, an associated configured bit is set and the instance is a network channel number. In the present invention when an instance is configured, the current role bits of the instance are set. The current role bits can be set in either of two ways.

The first way to configure an instance is during manual SPI programming. If a trigger button on a resource device is selected to capture a scene when the resource device is in the programming mode, the requester bit of the current role of the instance associated with the selected trigger button is set. If the selected trigger is the first trigger for the scene (not a scene copy), the administrator bit is also set. If the local load is also a member of the scene, the subscriber bit and the active bit are set. Resource devices that are members of the current new scene being programmed but were not selected to capture the scene store the new scene in one of the thirty-two subscriber-only instances, and the subscriber bit and the active bit are set. The roles are dynamic, in that the same trigger button and therefore the same associated instance could later be used to capture a different house scene. Further, the roles can change. The capture of a copy scene where the resource device local load is not a scene member would set the requester bit, but not the administrator or subscriber bit for the instance associated with the selected trigger button.

An instance copy can also be configured by a remote software utility through the macro command that contains a role parameter that defines how the current role bits are to be set.

In either case, trying to set a current role bit for a role that the corresponding role bit in the role capability does not have set is an error.

The active role further defines the subscriber role. If the subscriber role of a resource device instance controls something, the active bit of the instance is set. The load of a resource device instance whose active bit is set can be adjusted locally. If the scene compromise function is enabled and set active, the resource device will send a scene compromise message if the related load is adjusted. A not set active bit associated with a set subscriber bit does not cause this action, i.e., does not cause a scene compromise message to be set. An active subscriber, i.e., a resource device instance whose subscriber and active bits are both set, is capable of sending feedback (messages) to all requesters and subscribers with the related channel number. This aspect of the invention enables house scene compromise without adding extra objects as required in the past by HPnP.

In summary, the invention has several aspects. The aspects include a dynamic role selection ability, the ability of an object (instance) to have multiple roles, and the ability to add new roles to an object (instance). The invention allows commands and feedback to be distributed to all requesters and subscribers, keeping a "system-wide" resource synchronized, without wasting memory resources.

A resource may have multiple device values or states that requesters of a resource binding can toggle between. For example, a scene resource may have a value of "on" or activated. In the on or activated state, all of the resource device's scene members are turned on at the programmed scene device values. A scene resource may also have a value of "off" or deactivated. In the off or deactivated state, all of the resource device's scene members are turned off or returned to their pre-scene-launch device values. A resource requester may toggle between requesting the "on" and "off" scene state values.

Figure 6A:
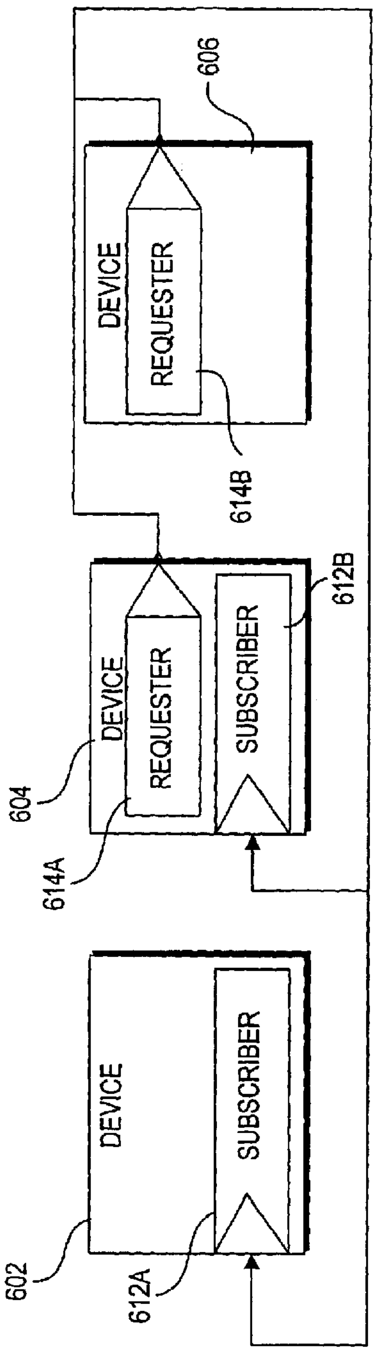
FIGS. 6A–B are block diagrams showing illustrative switch devices utilizing a typical prior art subscriber-requester resource binding and illustrative switch devices utilizing the binding with the dynamic resource role model, according to an actual embodiment of the invention.

Current subscriber-requester based protocols that provide for multiple requesters for the same scene can be inefficient. FIG. 6A illustrates a system that employs a typical prior art subscriber-requester based protocol binding of resource instances in three devices to a unique channel number. The devices may have many resource subscriber and requester objects, but only those bound to the same unique resource identifier or channel number are shown. Device 602 has a resource subscriber object 612A bound to the channel number. Device 604 has a resource subscriber object 612B and a resource requester object 614A bound to the channel number. Device 606 has a resource requester object 614B bound to the channel number. Note that if the resource requester object 614B in device 606 sends a command to the bound resource subscriber objects 612A and 612B, the resource requester object 614A in device 604 knows that all related subscribers have been effected because device 604 also has a subscriber object 612B for the channel number. Contrariwise, if the resource requester object 614A in device 604 sends a command to the bound resource subscriber objects, the requester resource object 614B in device 606 does not know that all related subscribers have been affected. An additional resource subscriber object must be bound in device 606 to make the action of the trigger buttons causing the generation of the commands identical.

Figure 6B:
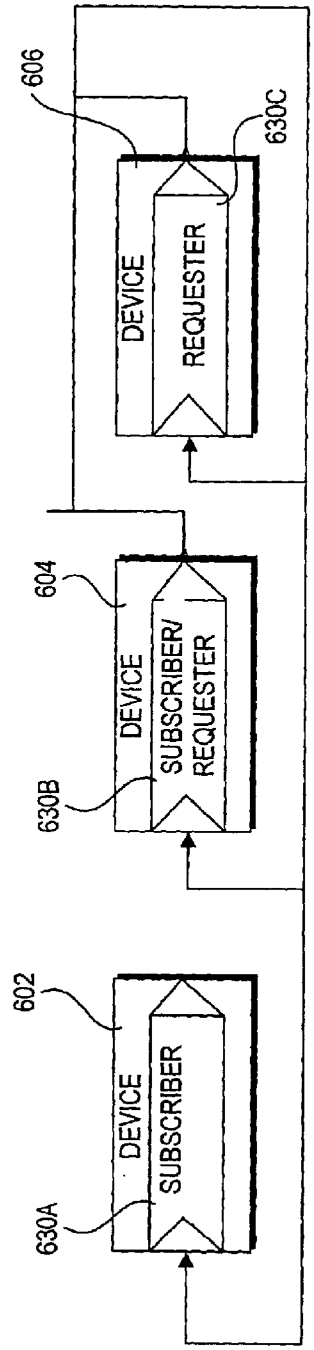

FIG. 6B illustrates the same device resources implemented using the dynamic resource role model of the invention. Each device has a dynamic resource object 630A, 630B, 630C. Device 602 has the subscriber role set in its dynamic resource object 630A. Device 604 has the both the requester role and the subscriber role set in its dynamic resource object 630B. Device 606 has the requester role set in its dynamic resource object 630C. Note that if the dynamic resource object with requester role set in either device 604 or device 606 send a command to the bound dynamic resource objects, all of the bound objects with the subscriber role set will be affected, and all of the bound objects with the requester role set will know that the bound subscribers have been affected.

The administrator role is responsible for maintaining house scene integrity while programming and in normal operation. In SPI programming, when a previously programmed trigger button is being overwritten to trigger a different scene, the scene that was previously triggered by the trigger button may have its integrity destroyed, because the previously triggered scene may no longer have any other trigger button in the system. If a scene cannot be triggered, it is invalid, and all the resource instantiations bound to that channel number should be unbound or unassociated, and cleared so that they can be reused. In addition, the actual embodiment of the invention described in this patent application and the other applications referenced above associates a particular house scene resource instance or instantiation with a particular device trigger button. Therefore, if a house scene is being captured to, i.e., associated with, a trigger button and the particular house scene resource instantiation already has an existing association with a different house scene, the existing house scene association is overwritten. If a scene is being overwritten, and house scene resource instantiation associated with that scene trigger button also is the administrator for the scene, the resource instantiation is required to hand off the administrative role to another local or remote trigger resource instantiation for that same scene, or if there is no other trigger, to totally dissolve and unbind the channel number. Also, since the requester role resource instantiation for the scene being overwritten may also be have a subscriber role in that scene, if the scene is not going to be dissolved, the scene subscriber role must be handed off to another available local house scene resource instantiation.

Figure 7:
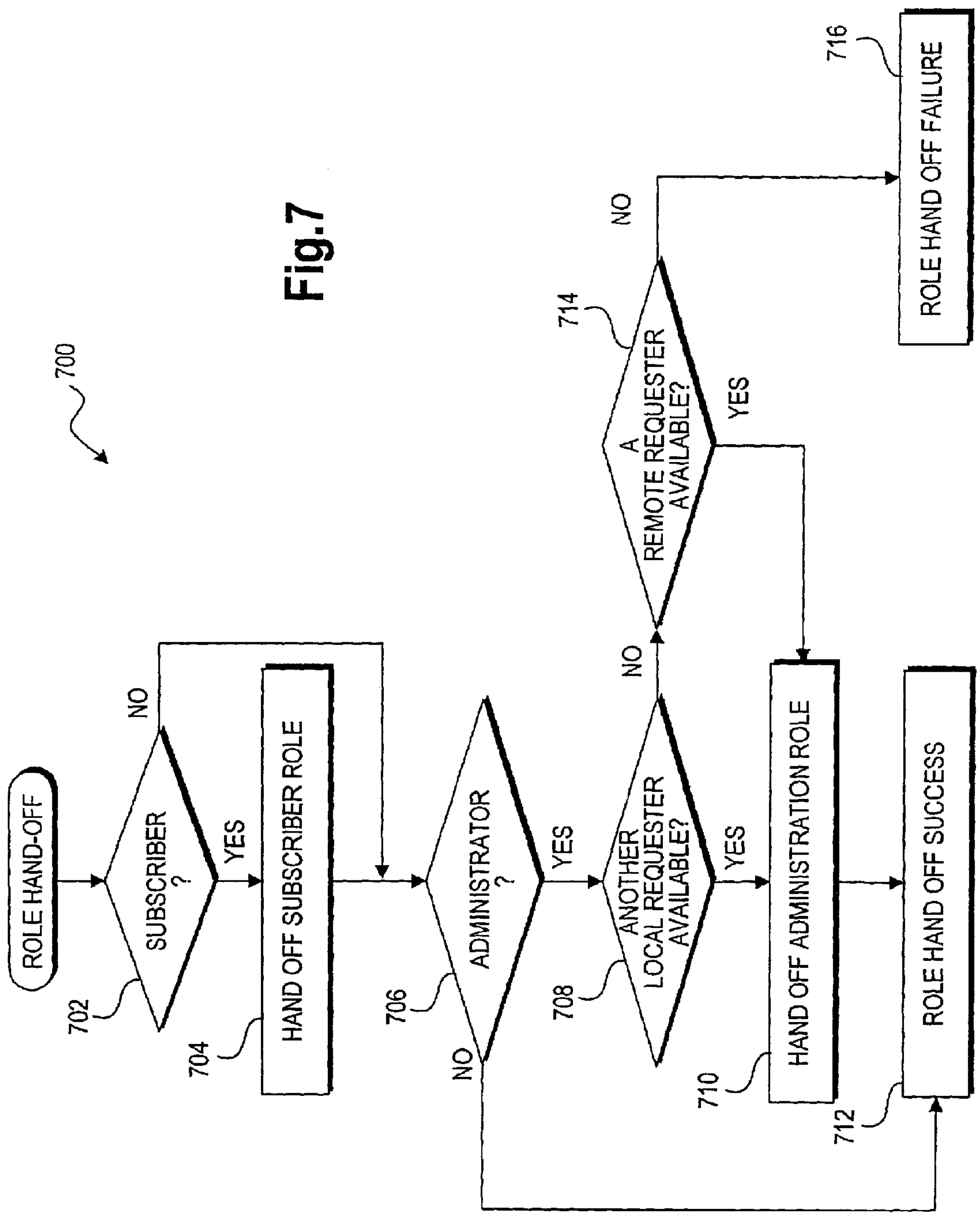
FIG. 7 is a flow diagram showing an illustrative routine machine for performing previous role assignment hand off when overwriting a trigger according to an actual embodiment of the present invention.

FIG. 7 illustrates a routine 700 for role hand-off of a house scene resource instantiation associated with a scene trigger button that is being overwritten. The routine 700 begins at block 702, where a test is made to determine if the resource instantiation currently is a subscriber. If the resource instantiation currently is a subscriber, the routine 700 proceeds to block 704 where the subscriber role is given to another available resource instantiation in the device. The house scene resource instantiation given the resource role is now associated as a subscriber to the house scene, and the routine 700 proceeds to block 706. If the resource instantiation currently is not a subscriber (block 702), the routine 700 branches to block 706.

At block 706 a test is made to determine if the resource instantiation is the administrator, i.e., currently has the administrator role set. If the resource instantiation is the administrator, the routine proceeds to block 708 where a test is made to determine if there is another local requester or trigger button for this particular house scene in the device. If there is another local requester for this particular house scene in the device, the routine 700 proceeds to block 710 where the administrator role is moved to the resource instantiation associated with the other local requester or trigger button. From block 710 the routine 700 proceeds to block 712, where the routine reports that the role hand-off is successful.

At block 708, if there is no other local requester for this particular house scene in the device, the routine 700 branches to block 714 where a test is made to determine if there is another requester or trigger button for this particular house scene in any device in the system that is capable of being an administrator. If there is another requester for this particular house scene in the system that is capable of being an administrator, the routine 700 proceeds to block 710 where the administrator role is moved to the remote device resource instantiation associated with the other remote requester or trigger button for that house scene. From block 710 the routine 700 proceeds to block 712 and reports that the role hand-off was successful. At block 714, if there is no other requester for this particular house scene in the device, the routine 700 branches to block 716 where the routine 700 reports that the role hand-off was not successful.

Figure 8:
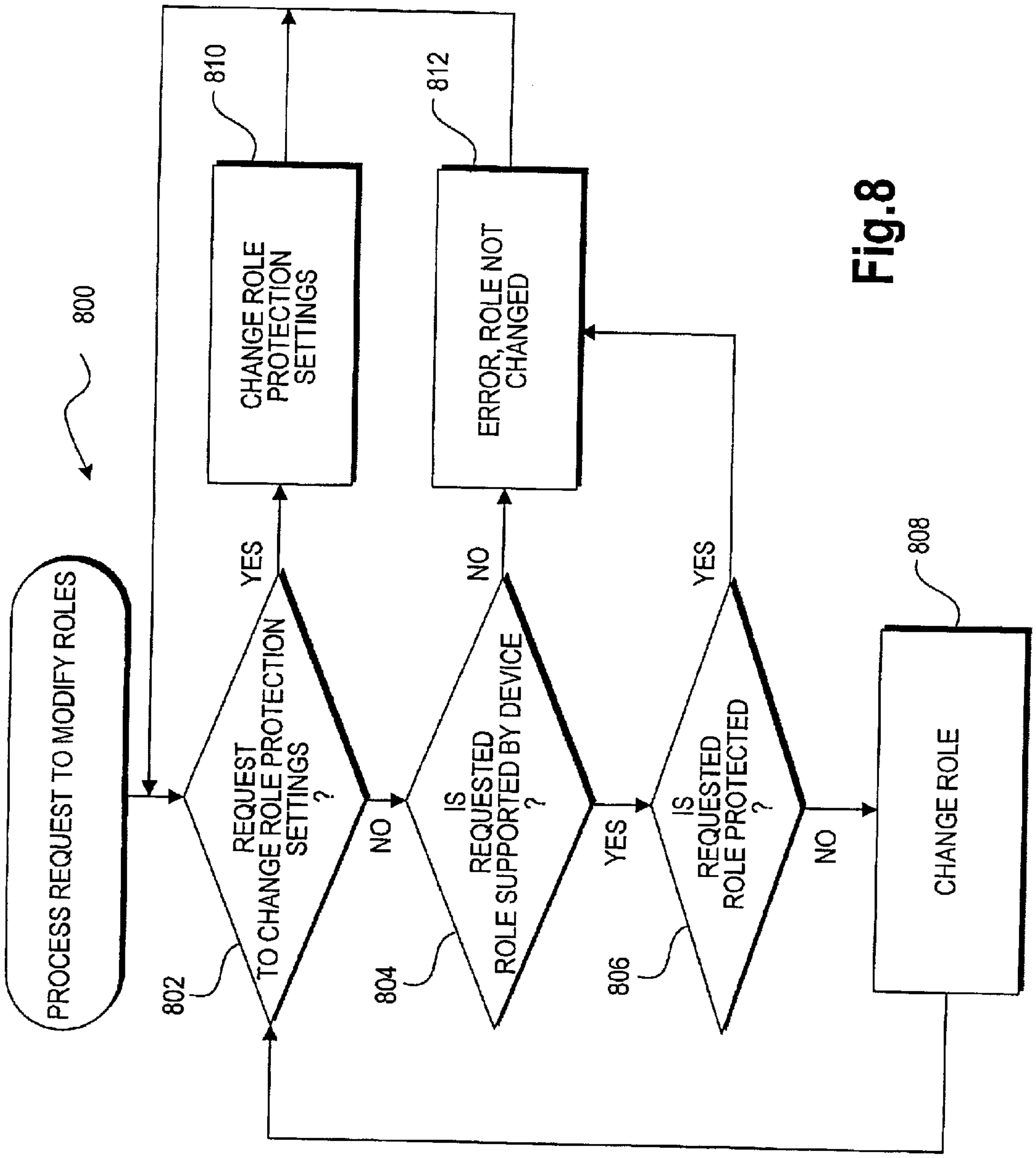
FIG. 8 is a flow diagram illustrating a routine for processing requests to modify roles according to an actual embodiment of the present invention.

FIG. 8 illustrates a routine 800 for processing a request to dynamically change the roles performed by a resource instantiation. The roles performed by a particular resource instantiation may change during programming, such as when a subscriber role is added, a requester role is added, the administrator role is added to the first requester of a scene, or the administrator role is handed off from a trigger being overwritten by a new scene. The routine 800 begins at block 802, where a test is made to determine whether the request is to change role protection setting. If the change is to the role protection setting, the routine 800 branches to block 810 and changes the role protection setting as requested. If the requested role change is not to the role protection setting, the routine 800 continues to block 804. At block 804 the requested roles are compared to the list of roles that the resource instance supports. Not all instances of a resource necessarily support the same roles. If a particular resource instance is requested and the particular resource instance does not support all of the requested roles, or the request is for any available unused resource instance, and none of the available unused resource instances found support for all of the requested roles, the routine 800 branches to block 812 where an error is returned. If the specified or found resource instance does support all the requested roles, the routine 800 continues to block 806 where a check of the role protection settings is made. If the request involves changing a role that is protected, the routine branches to block 812 where no change to the role is made and an error is returned. If the roles that will be changed by the request are not protected, the routine 800 continues to block 808 where the role change is completed. From blocks 808, 810, and 812, the routine 800 returns to block 802, where additional requests are processed.

Figure 9:
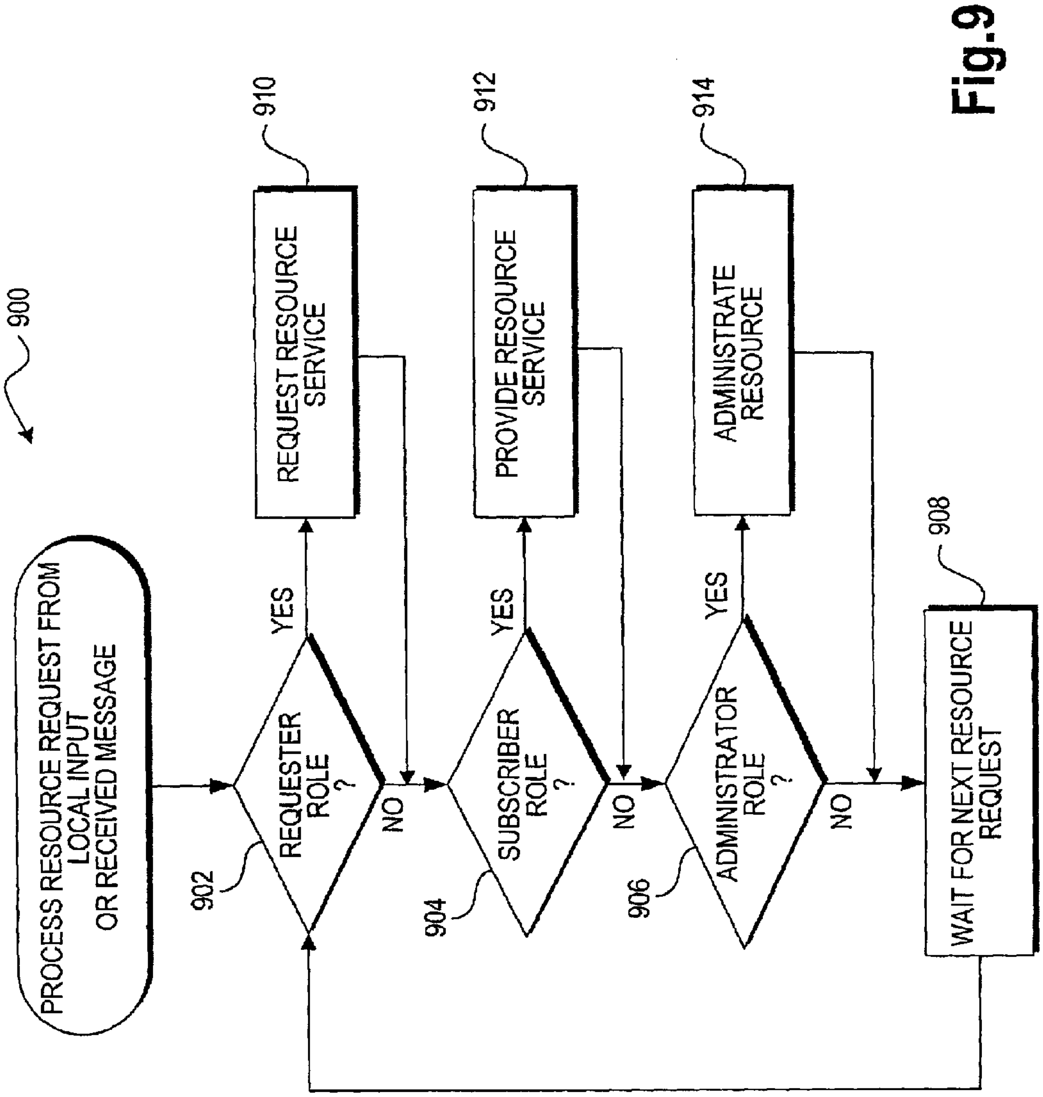
FIG. 9 is a flow diagram illustrating a routine for processing resource requests according to an actual embodiment of the present invention.

FIG. 9 illustrates a routine 900 for processing resource requests to a resource instance based on the dynamic resource role model 84 roles set. As described briefly above, the dynamic resource role model 84 provides the ability to dynamically assign roles to resource instances. Routine 900 begins at block 902 where a test is made to determine if the requester role is set. If the requester role is not set for the resource instance, the routine 900 branches to block 904. If the requester role is set, the routine 900 branches to block 910 where the applicable requester role service is processed. The routine 900 then continues to block 904.

At block 904 a test is made to determine if the subscriber role is set. If the subscriber role is not set for the resource instance, the routine 900 continues to block 906. If the subscriber role is set, the routine 900 branches to block 912 where the applicable subscriber role service is processed, before proceeding to block 906.

At block 906 a test is made to determine if the administrator role is set. If the administrator role is not set for the resource instance, the role based processing is finished and the routine 900 branches to block 908. If the administrator role is set, the routine 900 will branch to block 914 when the applicable administrator role service is processed, before proceeding to block 908. At block 908, the routine 900 waits for the next resource request. When the next resource request is received, the routine 900 cycles back to block 902 and the routine is repeated.

Figure 10:
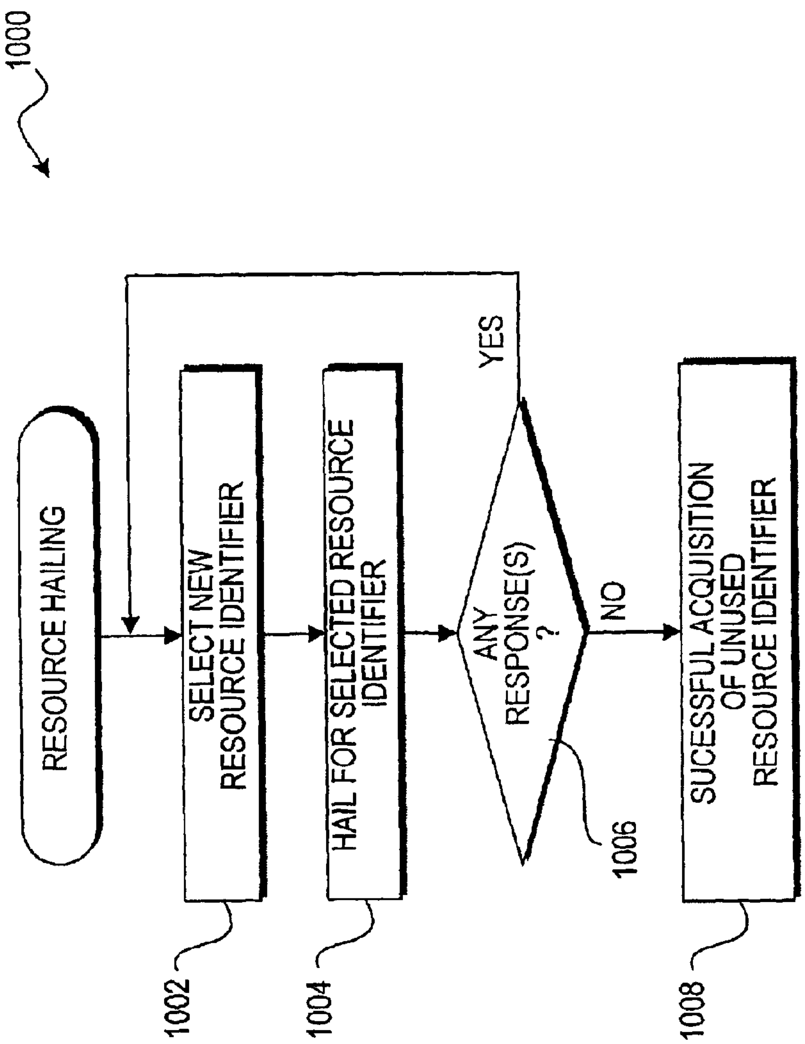
FIG. 10 is a flow diagram illustrating a resource hailing routine used to acquire a unique and unused resource identifier, according to an actual embodiment of the invention.

FIG. 10 illustrates a routine 1000 for resource identifier hailing that is used to acquire a unique and unused resource identifier. The administrator role may be used to more efficiently acquire a resource identifier in protocols where resource identifiers are acquired through a hailing process. The routine 1000 starts at block 1002 where a new resource identifier is picked. The routine 1000 then proceeds to block 1004 where all system devices are hailed or requested to respond if they contain that resource identifier indicating that the resource identifier is in use and not available. After sending the resource identifier hail, the routine 1000 proceeds to block 1006 where a test is made to see if there are one or more responses. If no response to the resource identifier hail is returned the resource identifier is assumed to be unused and available, and routine 1000 proceeds to block 1008 where the selected resource identifier becomes the acquired unique and unused resource identifier. If a response to the resource identifier hail is returned, the routine 1000 waits for all possible responses, and then branches back to block 1002 where a new resource identifier is selected and the process is repeated.

One concern is that if the resource identifier being hailed for is in many devices, many responses to one hail may be received, consuming considerable bandwidth, which is not desirable in low bandwidth systems and may slow down the unique resource identifier acquisition process. Since each resource identifier in use in a resource having the administrator role has one and only one administrator, a modified resource hail request that is responded to only by the administrator of an existing resource identifier may be used. Such usage minimizes the bandwidth and time to perform the unique resource identifier acquisition process. More specifically, since at most only one response is expected or possible, the time spent in block 1006 is minimized.

In addition, if the resource identification process is incremental, that is, each time a new identifier is selected by incrementing one more than the last selected but unavailable identifier, the administrator role may be used to efficiently minimize the number of hails required to increment up to an unused number. The device with the administrator role for a resource identifier hailing may be assigned the duty of selecting the next resource identifier as the next highest number that it does not internally, and then hailing for it. In this manner the responsibility to hail travels around to each hailed administrator in turn until no administrator responds to the last selected identifier, and the resource identifier is acquired. This process, called background channel hailing, is implemented in the actual embodiment of the current invention described herein.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A controller-implemented method of dynamically selecting a role for a resource device employed in a scene automation and control system comprising:

providing an object in a resource device having a plurality of predetermined roles that are dynamically settable, said roles including an administrator role, a requester role, and a subscriber role; and automatically setting the role of the resource device in response to either the receipt of a setting message or the manual adjustment of the resource device.

2. The controller-implemented method claimed in claim 1 wherein said roles also include an active role.

3. A controller-implemented method of dynamically selecting a role for a resource device employed in a scene automation and control system comprising:

providing an object in a resource device having a plurality of predetermined roles that are dynamically settable, said roles including a requester role and a subscriber role; and automatically setting the role of the resource device in response to either the receipt of a setting message or the manual adjustment of the resource device, wherein said resource device includes a plurality of preset bits for determining the role capacity of said object.

4. The controller-implemented method claimed in claim 3 wherein said roles also include an administrator role.

5. The controller-implemented method claimed in claim 4 wherein said roles also include an active role.

6. The controller-implemented method claimed in claim 3 wherein said predetermined roles are dynamically set in response to the receipt of a setting message or the manual adjustment of the resource device only if related role capacity bits that correspond to said predetermined roles are set.

7. The controller-implemented method claimed in claim 6 wherein said roles also include an administrator role.

8. The controller-implemented method claimed in claim 7 wherein said roles also include an active role.

9. A method of dynamically selecting a role for a resource device employed in a scene automation and control system comprising:

providing an object in a resource device having a plurality of predetermined roles that are dynamically settable, said roles including a requester role and a subscriber role; and automatically setting the role of the resource device in response to either the receipt of a setting message or the manual adjustment of the resource device, wherein said object has a plurality of instances, each of said instances including a plurality of predetermined roles including a requester role and a subscriber role and wherein said instances of said object are automatically set in response to the receipt of a setting message or the manual adjustment of the resource device.

10. The controller-implemented method claimed in claim 9 wherein said roles also include an administrator role.

11. The controller-implemented method claimed in claim 10 wherein said roles also include an active role.

12. The controller-implemented method claimed in claim 9 wherein said resource device also includes preset bits for determining the role capacity of said instances of said object.

13. The controller-implemented method claimed in claim 12 wherein said roles also include an administrator role.

14. The controller-implemented method claimed in claim 13 wherein said roles also include an active role.

15. The controller-implemented method claimed in claim 12 wherein said roles of said instances are dynamically set in response to receipt of a setting message or the manual adjustment of said resource device only if the role capability bits that correspond to said predetermined roles are set.

16. The controller-implemented method claimed in claim 15 wherein said roles also include an administrator role.

17. The controller-implemented method claimed in claim 16 wherein said roles also include an active role.

18. A resource device for a scene automation and control system comprising:

(a) a plurality of input devices for controlling the operation of a microcontroller; and (b) a microcontroller for controlling the operation of a load, said microcontroller including:

(1) a microprocessor; and (2) firmware, said firmware:

(i) including an object having a plurality of predetermined roles that are dynamically settable, said roles including an administrator role, a requester role, and a subscriber role; and (ii) automatically setting the role of said object in response to either the receipt of a setting message or the manual adjustment of said plurality of input devices.

19. A resource device for a scene automation and control system comprising:

(a) a plurality of input devices for controlling the operation of a microcontroller; and (b) a microcontroller for controlling the operation of a load, said microcontroller including:

(1) a microprocessor; and (2) firmware, said firmware:

(i) including an object having a plurality of predetermined roles that are dynamically settable, said roles including an active role, a requester role, and a subscriber role; and (ii) automatically setting the role of said object in response to either the receipt of a setting message or the manual adjustment of said plurality of input devices.

20. A resource device for a scene automation and control system comprising:

(a) a plurality of input devices for controlling the operation of a microcontroller; and (b) a microcontroller for controlling the operation of a load, said microcontroller including:

(1) a microprocessor; and (2) firmware, said firmware:

(i) including an object having a plurality of predetermined roles that are dynamically settable, said roles including a requester role and a subscriber role; and (ii) automatically setting the role of said object in response to either the receipt of a setting message or the manual adjustment of said plurality of input devices, wherein said firmware also includes preset bits for determining the role capacity of said object.

21. A resource device as claimed in claim 20 wherein said roles of said object also include an administrator role.

22. A resource device as claimed in claim 21 wherein said roles of said object also include an active role.

23. A resource device as claimed in claim 20 wherein said predetermined roles of said resource object are dynamically set in response to the manual adjustment of said input devices or the receipt of a setting message only if related role capacity bits that correspond to said predetermined roles are set.

24. A resource device as claimed in claim 23 wherein said roles of said object also include an administrator role.

25. A resource device as claimed in claim 24 said roles of said object also include an active role.

26. A resource device for a scene automation and control system comprising:

(a) a plurality of input devices for controlling the operation of a microcontroller; and (b) a microcontroller for controlling the operation of a load, said microcontroller including:

(1) a microprocessor; and (2) firmware, said firmware:

(i) including an object having a plurality of predetermined roles that are dynamically settable, said roles including a requester role and a subscriber role; and (ii) automatically setting the role of said object in response to either the receipt of a setting message or the manual adjustment of said plurality of input devices, wherein said firmware includes a plurality of instances of said object, each of said instances including a plurality of predetermined roles including a requester role and a subscriber role.

27. A resource device as claimed in claim 26 wherein said roles of said instances also include an administrator role.

28. A resource device as claimed in claim 27 wherein said roles of said instances also include an active role.

29. A resource device as claimed in claim 27 wherein said firmware includes preset bits for determining the role capacity of said instances.

30. A resource device as claimed in claim 27 wherein said roles of said instances also include an administrator role.

31. A resource device as claimed in claim 28 wherein said roles of said instances also include an active role.

32. A resource device for a scene automation and control system comprising:

(a) a plurality of input devices for controlling the operation of a microcontroller; and (b) a microcontroller for controlling the operation of a load, said microcontroller including:

(1) a microprocessor; and (2) firmware, said firmware:

(i) including an object having a plurality of predetermined roles that are dynamically settable, said roles including a requester role and a subscriber role; and (ii) automatically setting the role of said object in response to either the receipt of a setting message or the manual adjustment of said plurality of input devices, wherein said predetermined roles of said instances are dynamically set in response to the manual adjustment of said input devices or said setting message only if the related role capacity bits that correspond to said predetermined roles are set.

33. A resource device as claimed in claim 32 wherein said roles of said instances also include an administrator role.

34. A resource device as claimed in claim 33 wherein said roles of said instances also include an active role.

* * * * *